(12) United States Patent
Kelley et al.

(10) Patent No.: US 6,651,084 B1
(45) Date of Patent: Nov. 18, 2003

(54) SYSTEM AND METHOD FOR ADDING PLUG-INS TO A WEB BROWSER

(75) Inventors: Edward E. Kelley, Wappinger Falls, NY (US); Franco Motika, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/449,875

(22) Filed: Nov. 29, 1999

(51) Int. Cl.[7] .............................................. G06F 15/16
(52) U.S. Cl. ........................ 709/202; 709/231; 709/232
(58) Field of Search ................................. 709/201, 202, 709/227–229, 230–232

(56) References Cited

U.S. PATENT DOCUMENTS

| | | | |
|---|---|---|---|
| 5,877,759 A | 3/1999 | Bauer | 709/217 |
| 5,903,728 A | 5/1999 | Semenzato | 709/217 |
| 6,006,279 A | * 12/1999 | Hayes | 709/328 |
| 6,421,726 B1 | * 7/2002 | Kenner et al. | 709/219 |

OTHER PUBLICATIONS

Shareware Music Machine (smm@nopam–hitsquad.com), New PC Free Music Software Downloads, Jul. 16, 1998, pp. 1–2.*

Digigami Plugsy, Plugsy Documentation (digigami.com/plugsy/documentation), pp. 1–4.*

Re: Netscape 3.0 beta 4 Enabling Plugins?, David Martin, May 24, 1995, p. 1.*

Re: plug–ins problem, akif@ix.netcom.com, Jan. 30, 1997, p. 1.*

* cited by examiner

Primary Examiner—Bharat Barot
Assistant Examiner—Sindya Narayanaswamy
(74) Attorney, Agent, or Firm—James J. Cioffi

(57) ABSTRACT

A system and method for adding a plug-in to a web browser, the system and method comprising providing a general functions list that lists at least one function that can be performed by at least one registered plug-in through the web browser, and selecting one function that a user would like to add to the web browser from the general functions list. In one preferred embodiment, the system and method further comprise generating a specific plug-ins list that lists at least one registered plug-in that can perform the selected function, and selecting one registered plug-in to perform the selected function from the specific plug-ins list. In one preferred embodiment, the system and method comprise the selecting of a registered plug-in from a general plug-ins list that lists at least one registered plug-in, and the providing of a specific functions list that lists every function that the selected registered plug-in can perform.

19 Claims, 4 Drawing Sheets

GENERAL FUNCTIONS LIST

| Mime/Type | Description | File Extension |
|---|---|---|
| audio/basic | AU | au |
| audio/x-wav | WAV | wav |
| audio/midi | MIDI | mid, midi |

SPECIFIC PLUG-INS LIST

For audio/basic 30,32 — AAAA ...
30,32 — BBBB ...
30,32 — CCCC ...
30,32 — DDDD ...

FIG. 3                    ↘ 46

FIG. 4    REGISTERED PLUG-IN INFORMATION

Company Name  –  ABC Company
Application Name  –  AudioTime
52 — URL to download

SPECIFIC FUNCTIONS LIST

| Mime/Type | Description | File Extension |
|---|---|---|
| 36 — audio/basic | AU | au |
| 36 — audio/x-wav | WAV | wav |
| 36 — audio/midi | MIDI | mid, midi |

48 ↙  ↘ 42

SYSTEM AND METHOD FOR ADDING PLUG-INS TO A WEB BROWSER

FIELD OF THE INVENTION

The present invention relates generally to web browser enhancements. More particularly, the present invention relates to a system and method for adding plug-ins to a web browser.

BACKGROUND OF THE INVENTION

Web browsers require application or programs called plug-ins to perform certain functions. As used herein, any operation that can be performed by a plug-in, such as opening and viewing a certain file type, will be referred to as a function. Once a plug-in is installed, the web browser can perform all the functions that the installed plug-in can perform. Typically, each plug-in can perform a multitude of functions, such as open a video file, view an animation file, and open an audio file. Some of the plug-ins are free, while other plug-ins require payment. Since the amount of plug-ins are increasing in number, knowing which plug-in to select can be a difficult task and installing the right set of plug-ins can be a complex process.

It is difficult to figure out all the functions the web browser is capable of performing and which plug-ins provide which functions. It is not necessarily a one-to-one relationship. Plug-ins may provide solutions to multiple functions. Sometimes, multiple plug-ins capable of performing the same functions are installed. This overlap in functions causes a waste in disk space, and often confusion on the part of the user as to which plug-in is executing which function. For example, a plug-in for viewing animations may also contain a function for listening to audio, while a plug-in for viewing movies may contain the same function for listening to audio. By installing both the plug-in for viewing animations and the plug-in for viewing movies, the user would have installed two plug-ins which provide the same function, that is, a function for listening to audio. What is needed is an easy way to determine which plug-ins are required for performing which functions, and what is the optimal set of plug-ins for the user to install.

SUMMARY OF THE INVENTION

In view of the above limitations of existing web browsers, it is an aspect of the present invention to provide a computer system comprising a processor, a storage medium operatively coupled with the processor, a web browser that executes in the processor from the storage medium and that utilizes plug-ins, and a plug-in utility that executes in the processor from the storage medium and that organizes plug-ins. The plug-in utility is configured to provide a general functions list that lists at least one function that can be performed by at least one registered plug-in through the web browser. The plug-in utility is further configured to generate a specific plug-ins list that lists at least one registered plug-in that can perform a selected function. In one preferred embodiment, the plug-in utility is configured to download a selected registered plug-in. In another preferred embodiment, the plug-in utility is configured to provide a general plug-ins list that lists at least one registered plug-in, and to provide a specific functions list that lists every function for a selected registered plug-in.

Another aspect of the present invention is to provide a method of adding a plug-in to a web browser, the method comprising providing a general functions list that lists at least one function that can be performed by at least one registered plug-in through the web browser, and selecting one function that a user would like to add to the web browser from the general functions list. In one preferred embodiment, the method further comprises generating a specific plug-ins list that lists at least one registered plug-in that can perform the selected function, and selecting one registered plug-in to perform the selected function from the specific plug-ins list. In one preferred embodiment, the method comprises selecting a registered plug-in from a general plug-ins list that lists at least one registered plug-in, and the providing of a specific functions list that lists every function that the selected registered plug-in can perform.

As will be appreciated by those of skill in this art, the above described aspects of the present invention may also be provided as apparatus or computer program products and is particularly well suited to program tools, applications, or operating systems which utilize plug-ins.

BRIEF DESCRIPTION OF THE DRAWINGS

FIG. 3 is an example of a specific plug-ins list, according to one preferred embodiment of this invention;

FIG. 4 is an example of registered plug-in information, according to one preferred embodiment of this invention;

DETAILED DESCRIPTION OF THE PRESENTLY PREFERRED EMBODIMENTS

The presently preferred embodiments will now be described more fully hereinafter with reference to the accompanying drawings, in which the presently preferred embodiments are shown. This invention may, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method, data processing system or program product. Accordingly, the present invention may take the form of an entirely hardware embodiment, an entirely software embodiment or an embodiment combining software and hardware aspects. Furthermore, the present invention may take the form of a computer program product on a computer-readable storage medium 29 having computer-readable program code means embodied in the storage medium 29. Any suitable storage medium 29 may be utilized including read-only memory (ROM), RAM, DRAM, SDRAM, hard disks, CD-ROMs, DVD-ROMs, any optical storage device, and any magnetic storage device.

Figures 1, 2:
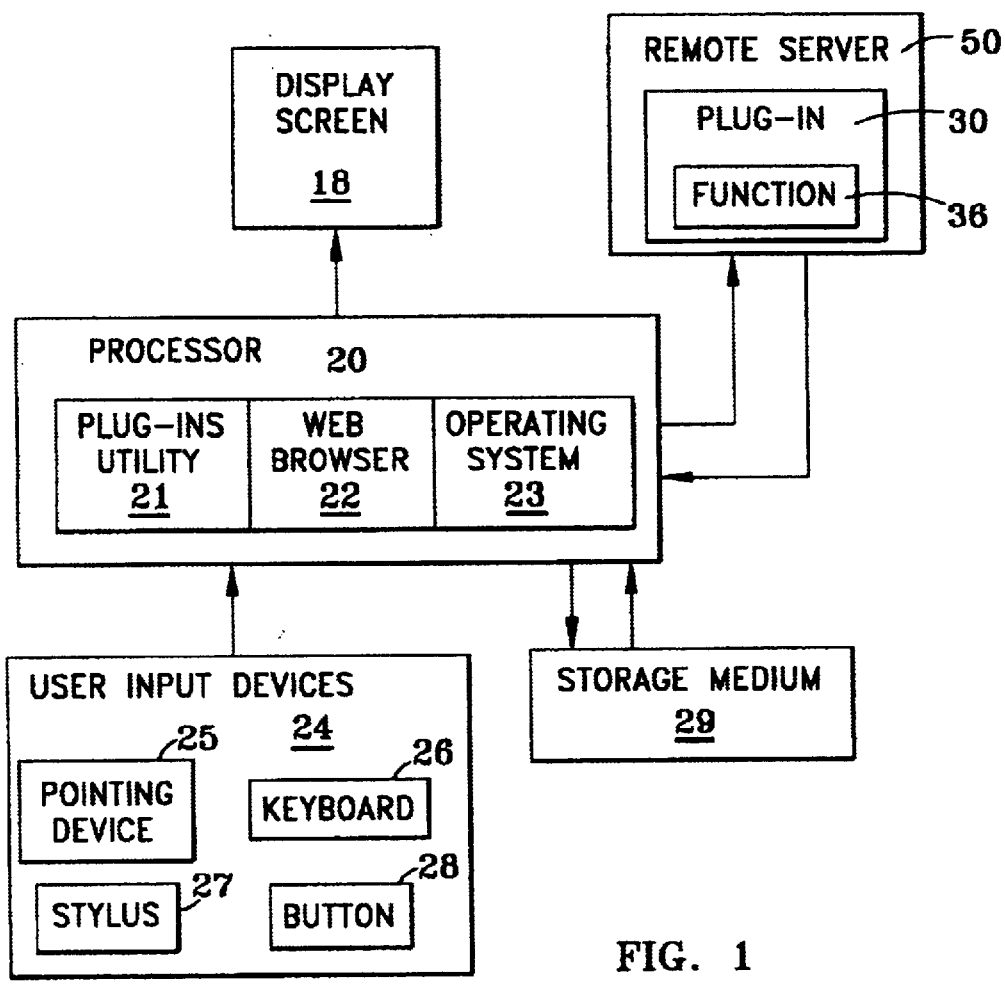
FIG. 1 is a block diagram of a computer system utilizing the present invention.
FIG. 2 is an example of a general functions list, according to one preferred embodiment of this invention.

FIG. 1 illustrates a computer system 10 in which plug-ins utility 21 may be utilized, according to one preferred embodiment. Computer system 10 comprises processor 20, storage medium 29, web browser 22, and plug-in utility 21. Processor 20 is any programmable electronic device that can store, retrieve, and process data. As seen in FIG. 1, processor 20 may have plug-ins utility 21, web browser 22, and operating system 23 resident in processor 20. Processor 20 displays information on display screen 18. The contents of display screen 18 may be controlled or altered by plug-ins utility 21, web browser 22, or operating system 23 either individually or in combination. Storage medium 29 is operatively coupled with processor 20, wherein processor 20 can store and retrieve data from storage medium 29. Storage medium 29 permanently or temporarily stores information and applications such as plug-in utility 21, web browser 22, and operating system 23.

Web browser 22 is an application than can be used to access, download, and view information on the Internet, including pages on the World Wide Web. Web browser 22 executes in processor 20 from storage medium 29. Web browser 22 requires plug-ins 30 to add functions 36 to web browser 22. Web browser 22 utilizes plug-ins utility 21 to add plug-ins 30 and functions 36 to web browser 22. In one preferred embodiment, web browser 22 and plug-ins utility 21 are running on operating system 23.

Plug-in utility 21 executes in processor 20 from storage medium 29 and organizes plug-ins 30. Plug-in utility 21 is configured to provide general functions list 40 that lists at least one function 36 that can be performed by at least one registered plug-in 32 through web browser 22. In one preferred embodiment, plug-in utility 21 is further configured to generate specific plug-ins list 46 that lists at least one registered plug-in 32 that can perform a selected function 36. In one preferred embodiment, plug-in utility 21 is configured in such a way that web browser 22 can invoke execution of plug-in utility 21.

For obtaining input from a user, computer system 10 may utilize user input devices 24, as illustrated in FIG. 1. User input devices 24 may be used to designate areas of the screen by performing a pointing operation on those areas. User input devices 24 may also be used to input or select the name of a plug-in 30 or function 36 and send the name of the plug-in 30 or function 36 to plug-ins utility 21. User input devices 24 may be used to input information, such as the name of function 36 that the user would like to add to web browser 22. In one embodiment, user input devices 24 are used to select plug-in 30 so that a user can obtain information about plug-in 30. User input devices 24 may include pointing device 25, keyboard 26, stylus 27, button 28, or any other input devices known to those of skill in the art. Pointing device 25 may include a mouse, a trackball, a touch pad, a graphics tablet, or other pointing devices known to those skilled in the art. Pointing device 25 allows a user to move a mouse pointer located in display screen 18 over an object located in display screen 18, to select that object. Stylus 27 can be used to input text and other information and select objects on display screen 18. Keyboard 26 and button 28 can also be used to input text and other information and select objects on display screen 18.

Upon receiving the name of the plug-in 30 or function 36, plug-ins utility 21 transmits a request to download plug-in 30 having function 36 to remote server 50, whereupon remote server 50 transmits back the requested plug-in 30. Remote server 50 is a server located on the Internet that can be accessed selecting the URL address 52 for remote server 50. The selected URL address 52 points to the location of remote server 50. Once plug-in 30 is downloaded from remote server 50, web browser 22 may utilize any function 36 provided by plug-in 30.

In one preferred embodiment, the present invention comprises general functions list 40, as illustrated in FIG. 2. General functions list 40 lists at least one function 36 that can be performed by at least one registered plug-in 32 through web browser 22. Preferably, general functions list 40 lists every function 36 that can be performed by registered plug-ins 32. As used herein, function 36 is any operation that can be performed by plug-in 30, such as opening and viewing a certain file type. In one prefered embodiment, functions 36 are used to open a variety of file types, such as, for example: audio basic, audio/x-wav, and audio/midi, as illustrated in FIG. 2. In order to perform a certain function 36, web browser 22 is required to install plug-in 30. Plug-in 30 performs at least one function 36, and in one preferred embodiment, plug-in 30 performs multiple functions 36. Once installed, plug-in 30 allows web browser 22 to perform any function 36 that plug-in 30 can perform. Plug-ins 30 that are recognized by the present invention and reside in general plug-ins list 44 are referred to as registered plug-ins 32.

In one preferred embodiment, the present invention comprises multiple general functions lists 40, whereupon each general functions list 40 lists a particular group of functions 36. For example, one general functions lists 40 can list only functions 36 that deal with opening word processing files, while another general functions list 40 can list only functions that deal with opening and listening to audio files. In one preferred embodiment, the user is prompted to select one general functions list 40 from a list of general functions lists 40. Upon selecting one general functions list 40, the present invention allows the user to view the selected general functions list 40.

Upon viewing general functions list 40, a user then selects one function 36 that the user would like to add to web browser 22 from general functions list 40. In one preferred embodiment, functions 36 are hyper-linked to specific plug-ins list 46, so that when a user selects one function 36 from general functions list 40, the user is automatically taken to view specific plug-ins list 46. In one preferred embodiment, the user is prompted to select one function 36 from general functions list 40 that the user would like to add to web browser 22.

FIG. 3 illustrates an example of specific plug-ins list 46. In one preferred embodiment, upon selecting one function 36 from general functions list 40, the present invention generates specific plug-ins list 46 that lists at least one registered plug-in 32 that can perform the selected function 36. In the present example, if the user selects function 36 for audio/basic, the user is presented with specific plug-ins list 46, as illustrated in FIG. 3, which lists four registered plug-ins 32 that can perform the selected function 36 for audio/basic. In one preferred embodiment, specific plug-ins list 46 is generated by searching through general plug-ins list 44 for registered plug-ins 32 that can perform the selected function 36 and by building a list of registered plug-ins 32 that can perform the selected function 36.

Upon viewing specific plug-ins list 46, a user then selects one registered plug-in 32 to perform the selected function 36 from specific plug-ins list 46. In one preferred embodiment, registered plug-ins 32 are hyper-linked to registered plug-in information 48, so that when a user selects one registered plug-in 32 from specific plug-ins list 46, the user is automatically taken to view registered plug-in information 48, as illustrated in FIG. 4. In one preferred embodiment, registered plug-ins 32 are hyper-linked to specific functions list 42, so that when a user selects one registered plug-in 32 from specific plug-ins list 46, the user is automatically taken to view specific functions list 42. In one preferred embodiment, the user is prompted to select one registered plug-in 32 from specific plug-ins list 46 to perform the selected function 36.

In one preferred embodiment, after selecting one registered plug-in 32 to perform the selected function 36 from specific plug-ins list 46, the present invention retrieves the selected registered plug-in 32 and installs the selected registered plug-in 32. In one preferred embodiment, upon viewing registered plug-in information 48, the present invention retrieves the selected registered plug-in 32 and installs the selected registered plug-in 32. In one preferred embodiment, the user selects URL address 52, as illustrated in FIG. 4, whereupon the present invention retrieves the selected registered plug-in 32 and installs the selected registered plug-in 32. Once installed, registered plug-in 32 allows web browser 22 to perform all of the functions 36 that the installed registered plug-in 32 can perform, including the selected function 36. In one preferred embodiment, the selected registered plug-in 32 is retrieved from remote server 50.

FIG. 4 illustrates an example of registered plug-in information 48. Registered plug-in information 48 lists information regarding registered plug-in 32 such as the name of the company that produced registered plug-ins 32, the name of registered plug-in 32, URL address 52, and specific functions list 42. URL address 52 is the address for the page on the World Wide Web where the selected registered plug-in 32 resides. In one preferred embodiment, the user may select URL address 52 and web browser 22 will display the page on the World Wide Web at which the selected registered plug-in 32 resides, whereupon the user may select and download registered plug-in 32. Specific functions list 42 lists at least one, and preferably every, function 36 that the selected registered plug-in 32 can perform. In the present example, upon selection of the registered plug-in 32 entitled "AudioTime," the present invention displays registered plug-in information 48 for "AudioTime" including specific functions lists 42 which lists every function 36 of "AudioTime" such as audio/basic, audio/x-wav, and audio/midi. In one preferred embodiment, functions 36 listed in specific functions list 42 are hyper-linked to specific plug-ins list 46, so that when a user selects a function 36 listed in specific functions list 42, the user is automatically taken to view specific plug-ins list 46.

Figure 5:
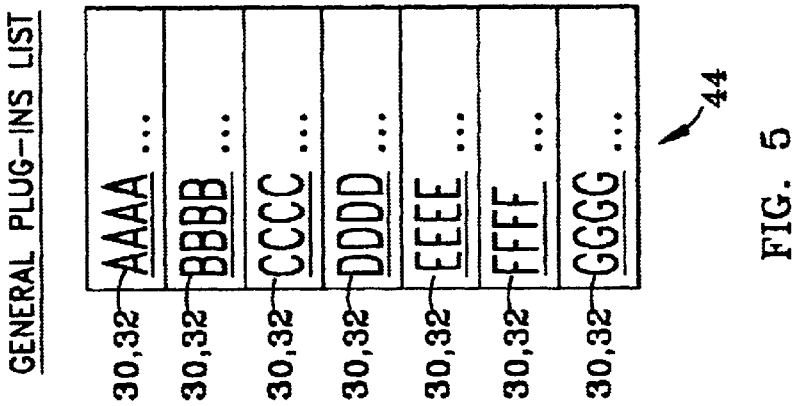
FIG. 5 is an example of a general plug-ins list, according to one preferred embodiment of this invention.

FIG. 5 illustrates an example of general plug-ins list 44. General plug-ins list 44 lists at least one registered plug-in 32. In one preferred embodiment, upon selecting one registered plug-in 32 from general plug-ins list 44, the present invention generates specific functions list 42 that lists at least one, and preferably every, function 36 that can be performed by the selected registered plug-in 32. In one preferred embodiment, after the selecting of one registered plug-in 32 to perform the selected function 36 from plug-ins list 44, the present invention retrieves the selected registered plug-in 32 and installs the selected registered plug-in 32.

In one preferred embodiment, the user is prompted to add registered plug-in 32 to web browser 22. If the user would like to add registered plug-in 32, the user is presented with general functions list 40. In one preferred embodiment, there are multiple general functions lists 40, whereupon each general functions list 40 lists a particular group of functions 36. For example, one general functions lists 40 can list only functions 36 that deal with opening word processing files, while another general functions list 40 can list only functions that deal with opening and listening to audio files. In one preferred embodiment, the user is prompted to select one general functions list 40 from a list of general functions lists 40. Upon selecting one general functions list 40, the present invention allows the user to view the selected general functions list 40.

In one preferred embodiment, the user is prompted to update general plug-ins list 44. If the user would like to update general plug-ins list 44, the present invention downloads a list of names of new plug-ins 34 and names of functions 36 for the new plug-ins 34 from remote server 50, appends general plug-ins list 44 to include the names of new plug-ins 34, and appends general functions list 40 to include the names of functions 36 performed by new plug-ins 34. In one preferred embodiment, if the user would like to update general plug-ins list 44, the present invention selects a URL address for updating general plug-ins list 44.

As will be appreciated by those of skill in this art, the preceding examples are provided, not to limit or define the scope of the present invention, but to illustrate the nature of the present invention and possible uses for the teachings of the present invention. These examples may be modified in many different ways while still obtaining the benefits of the teachings of the present invention.

Figure 6:
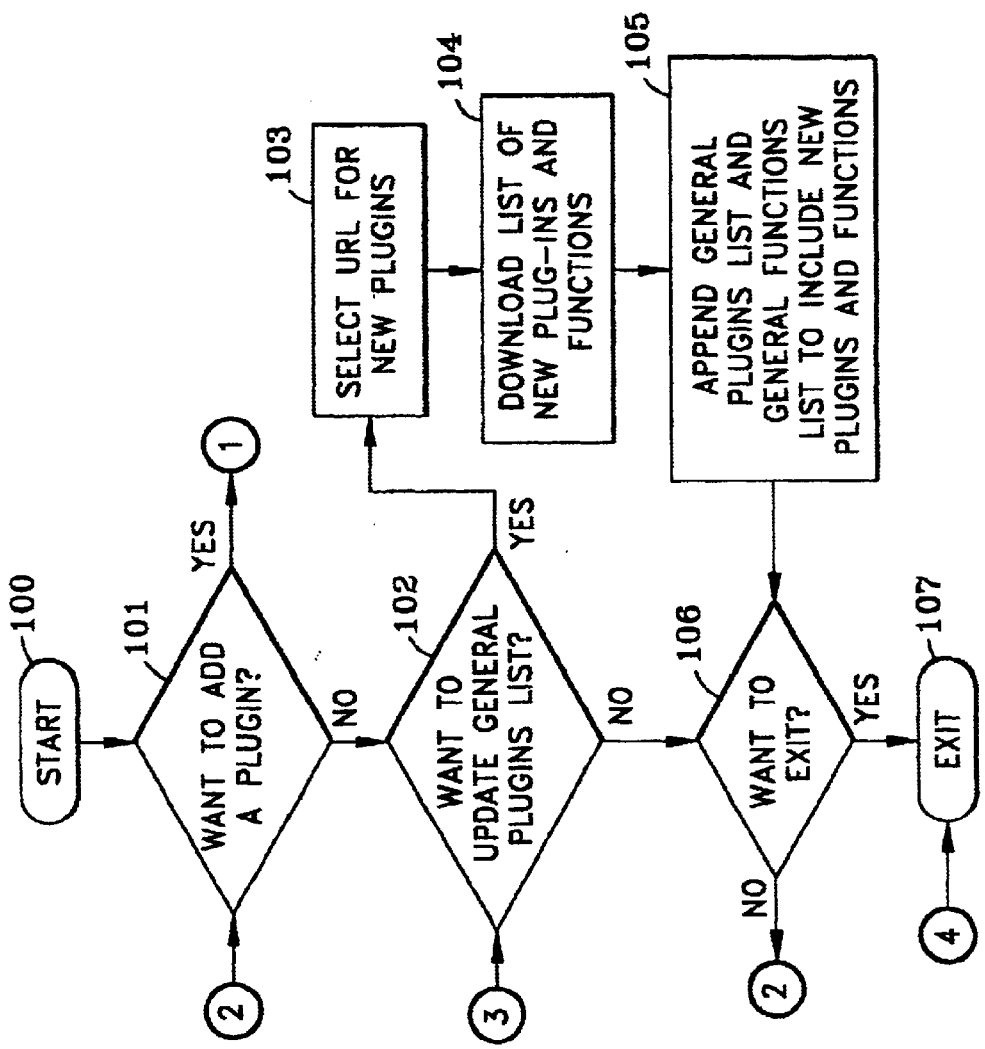
FIG. 6 is a flow chart of an add/update plug-in operation of the present invention.
Figure 7:
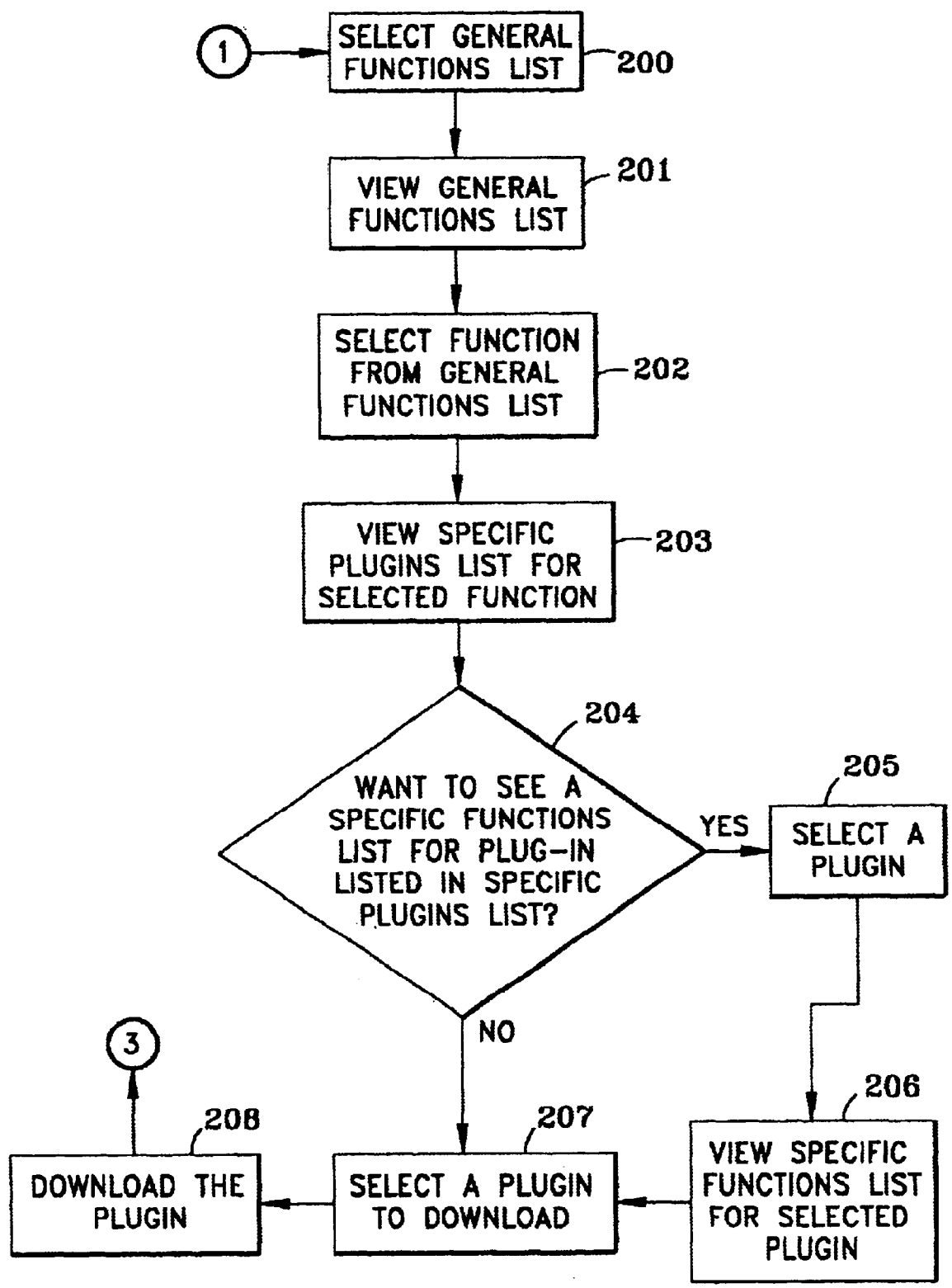
FIG. 7 is a flow chart of an add plug-in operation of the present invention.

FIGS. 6–7 are flowchart illustrations of methods, apparatus (systems) and computer program products according to the invention. It will be understood that each block of the flowchart illustrations, and combinations of blocks in the flowchart illustrations, can be implemented by computer program instructions. These computer program instructions may be loaded onto a computer or other programmable data processing apparatus to produce a machine, such that the instructions which execute on the computer or other programmable data processing apparatus create means for implementing the functions specified in the flowchart block or blocks. These computer program instructions may also be stored in a storage medium 29 that can direct a computer or other programmable data processing apparatus to function in a particular manner, such that the instructions stored in the storage medium 29 produce an article of manufacture including instruction means which implement the function specified in the flowchart block or blocks. The computer program instructions may also be loaded onto a computer or other programmable data processing apparatus to cause a series of operational steps to be performed on the computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

As seen in FIG. 6 an add/update plug-in operation is initiated in block 100. The add/update plug-in operation allows a user to add or update plug-in 30 that provides a selected function 36 to web browser 22. The add/update plug-in operation first prompts the user to add a registered plug-in 32, as illustrated in block 101. If the user would like to add a registered plug-in 32, the add/update plug-in operation moves to block 200 whereupon an add plug-in operation is initiated.

If the user does not want to add a registered plug-in 32, the user is prompted to update general plug-ins list 44, as illustrated in block 102. If the user does not want to update general plug-ins list 44, the user is prompted to exit from the add/update plug-in operation at block 106. If the user would like to update general plug-ins list 44, the add/update plug-in operation then selects a URL address for updating general plug-ins list 44, as illustrated in block 103. Selecting a URL address 52 involves searching the Internet for any application that can be used as a plug-in 30 that is available for sale or for free. In one preferred embodiment, a URL address 52 is provided that provides a list of every known application that can be used as a plug-in 30. This list is then compared to general plug-ins list 44, and the names of new plug-ins 34 not listed in general plug-ins list 44 are then downloaded along with the names of functions 36 for new plug-ins 34, as illustrated in block 104. In one preferred embodiment, in addition to the names of functions 36 and the names of new plug-ins 34, additional information, such as the mime type, description and file extension is downloaded for every function 36. In one preferred embodiment, the company name, application name, and the URL address 52 for downloading new plug-ins 34 is downloaded for each new plug-in 34. Upon downloading the names of new plug-ins 34 and the name of functions 36 for the new plug-ins 34, the add/update plug-in operation appends general plug-ins list 44 to include the names of new plug-ins 34, and appends general functions list 40 to include the names of functions 36 performed by new plug-ins 34, as illustrated in block 105. If a general functions list 40 does not exist for a particular group of functions 36, then a general functions list 40 is created.

Upon appending general plug-ins list 44 and general functions list 40, the add/update plug-in operation prompts the user to exit from the add/update plug-in operation at block 106. If the user wishes to exit, the add/update plug-in operation is terminated at block 107. If the user does not wish to exit, the add/update plug-in operation moves to block 101.

As seen in FIG. 7 the add plug-in operation is initiated in block 200. The add plug-in operation allows a user to add plug-in 30 that provides a selected function 36 to web browser 22. In one preferred embodiment, the add plug-in operation first prompts the user to select a general functions list 40, as illustrated in block 200. Upon selecting a general functions list 40, the user is allowed to view the selected general functions list 40 at block 201. The user then selects one function 36 that the user would like to add to web browser 22 from general functions list 40, as illustrated in block 202. Upon selecting one function 36, the add plug-in operation then generates specific plug-ins list 46 that lists at least one registered plug-in 32 that can perform the selected function 36, as illustrated in block 203.

At this point, the add plug-in operation prompts the user to see specific functions list 42 for a registered plug-in 32 listed in specific plug-ins list 46, as illustrated in block 204. If the user does not want to see specific functions list 42 for a registered plug-in 32 listed in specific plug-ins list 46, the user can then select a registered plug-in 32 to download at block 207, and the add plug-in operation will then download the selected registered plug-in 32 at block 208.

If the user would like to see specific functions list 42 for a registered plug-in 32 listed in specific plug-ins list 46, the user must select a registered plug-in 32 listed in specific plug-ins list 46, as illustrated in block 205. Upon selecting a registered plug-in 32 listed in specific plug-ins list 46, the user is allowed to view specific functions list 42 that lists every function for the selected registered plug-in 32. The user can then select a registered plug-in 32 to download at block 207, and the add plug-in operation will then download the selected registered plug-in 32 at block 208. After downloading the selected registered plug-in 32, the user is prompted to update general plug-ins list 44, as illustrated in block 102.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

What is claimed is:

1. A computer system comprising:
   a processor;
   a storage medium operatively coupled with the processor;
   a web browser executed by the processor and retrievable from the storage medium, the web browser further configured to utilize plug-ins; and
   a plug-in utility, executed by the processor and retrievable from the storage medium, the plug-in utility for organizing plug-ins;
   wherein the plug-in utility is configured to maintain a general functions list that lists at least one function associated with at least one registered plug-in, each registered plug-in corresponding to a plug-in that resides within a general plug-ins list maintained by the plug-in utility; and
   the plug-in utility is further configured to maintain a specific plug-ins list that lists at least one registered plug-in that performs a selected function, from the general functions list, through the web browser.

2. The computer system of claim 1, wherein the plug-in utility is configured to download a selected registered plug-in.

3. The computer system of claim 1, wherein the plug-in utility is configured to provide a general plug-ins list that lists at least one registered plug-in, and to provide a specific functions list that lists every function for a selected registered plug-in.

4. The computer system of claim 1, wherein the plug-in utility is configured to prompt a user to add a registered plug-in.

5. The computer system of claim 1, wherein the plug-in utility is configured to prompt a user to update the general plug-ins list.

6. The computer system of claim 1, wherein the plug-in utility is configured to select a URL address for updating the general plug-ins list, download a list of names of new plug-ins and names of functions for the new plug-ins, append the general plug-ins list to include the names of new plug-ins, and append the general functions list to include the names of functions performed by the new plug-ins.

7. The computer system of claim 1, wherein the plug-in utility is configured to generate a specific plug-ins list of at least one registered plug-in that can perform the selected function, wherein the specific plug-ins list is generated by searching through the general plug-ins list for registered plug-ins that can perform the selected function and by building a list of registered plug-ins that can perform the selected function.

8. The computer system of claim 1, wherein the plug-in utility is configured in such a way that the web browser can invoke execution of the plug-in utility.

9. A method of adding a plug-in to a web browser, the method comprising:

providing a general functions list that lists at least one function associated with at least one registered plug-in, each registered plug-in corresponding to a plug-in that resides within a maintained general plug-in list;

selecting from the general functions list a desired function that a user would like to add to the web browser such that the selected desired function is executable by the web browser; generating a specific plug-ins list that lists at least one registered plug-in that can perform the selected function; and selecting one registered plug-in to perform the selected function from the specific plug-ins list.

10. A method according to claim 9 further comprising the selecting of a registered plug-in from a general plug-ins list that lists at least one registered plug-in, and the providing of a specific functions list that lists every function that the selected registered plug-in can perform.

11. A method according to claim 9 further comprising the downloading of the selected registered plug-in.

12. A method according to claim 9 further comprising the prompting of the user to add a registered plug-in.

13. A method according to claim 9 further comprising the prompting of the user to update the general plug-ins list.

14. A method according to claim 13, further comprising selecting a URL address for updating the general plug-ins list, downloading a list of names of new plug-ins and names of functions for the new plug-ins, appending the general plug-ins list to include the names of new plug-ins, and appending the general functions list to include the names of functions performed by the new plug-ins.

15. A method according to claim 9, wherein the selecting of one function that a user would like to add to the web browser from the general functions list comprises generating a specific plug-ins list of at least one registered plug-in that can perform the selected function, wherein the specific plug-ins list is generated by searching through the general plug-ins list for registered plug-ins that can perform the selected function and by building a list of registered plug-ins that can perform the selected function.

16. A computer program for adding a plug-in to a web browser, the computer program comprising:

a storage medium;

general functions list code on the storage medium for providing a general functions list that lists at least one function associated with at least one registered plug-in, each registered plug-in corresponding to a plug-in that resides within a maintained general plug-in list;

select function code on the storage medium for allowing a user to select from the general functions list a desired function that the user would like to add to the web browser such that the selected desired function is executable by the web browser;

specific plug-ins list code on the storage medium for generating a specific plug-ins list that lists at least one registered plug-in that can perform the selected desired function, and select plug-ins code on the storage medium for selecting one registered plug-in to perform the selected desired function from the specific plug-ins list.

17. A computer program according to claim 16 further comprising download plug-in code on the storage medium for downloading the selected registered plug-in.

18. A computer program according to claim 16 further comprising update plug-ins code on the storage medium for selecting a URL address for updating the general plug-ins list, downloading a list of names of new plug-ins and names of functions for the new plug-ins, appending the general plug-ins list to include the names of new plug-ins, and appending the general functions list to include the names of functions performed by the new plug-ins.

19. A computer program according to claim 16, wherein the select function code comprises generating a specific plug-ins list of at least one registered plug-in that can perform the selected function, wherein the specific plug-ins list is generated by searching through the general plug-ins list for registered plug-ins that can perform the selected function and by building a list of registered plug-ins that can perform the selected function.

* * * * *